Nov. 3, 1936.                P. CAVITT                2,059,848
                        SEAT CONNECTING DEVICE
                          Filed March 8, 1935
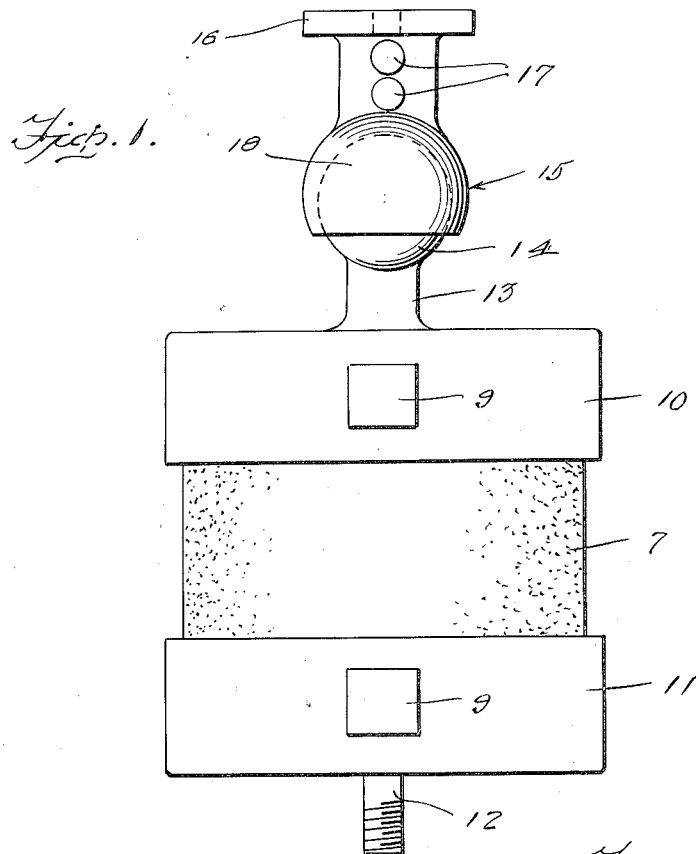
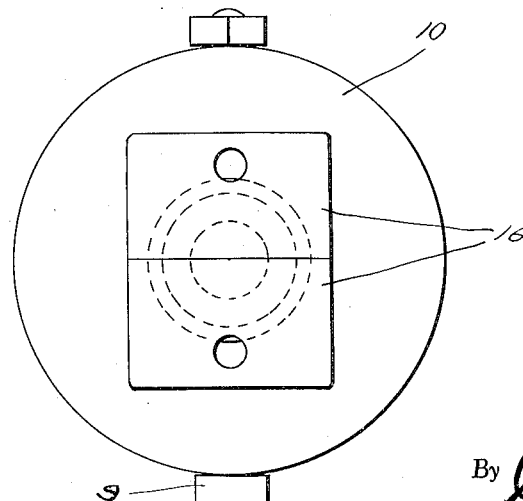
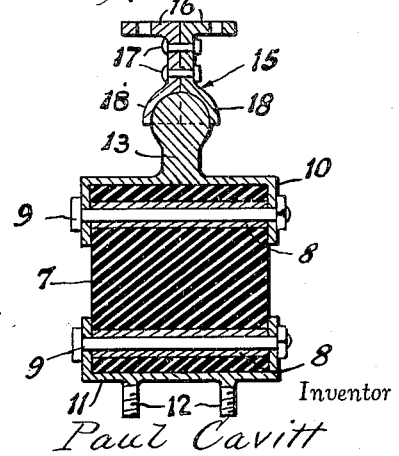
Inventor
Paul Cavitt
By *Clarence A. O'Brien*
                                    Attorney Patented Nov. 3, 1936

2,059,848

UNITED STATES PATENT OFFICE 2,059,848

SEAT CONNECTING DEVICE

Paul Cavitt, Watseka, Ill.

Application March 8, 1935, Serial No. 10,099

3 Claims. (Cl. 155—51)

This invention relates to an especially constructed device designed with a view toward providing a unique coupling between an operator's seat and the frame structure of farming machinery.

Being classified as an accessory for use in conjunction with agricultural machinery, such as for example, tractors, binders, plows and the like, the invention is directed primarily to a unique compensating device employed for the convenience and comfort of the occupant of the seat. The three outstanding advantages capable of accomplishment through the adoption and use of this device may be described as ways and means for minimizing excessive vibration, this resulting in reduction of shock, and seating comfort of such character as to substantially eliminate fatigue caused by unnecessary side sway and incorrect posture of the body of the occupant.

Briefly described the invention is in the nature of an attachment for conventional machinery frame structures, said attachment including an adjustable adapter bracket to which the seat is directly attached, suitable means for joining the device to the frame or other part, and a resilient insulating and coupling block or body therebetween provided to function as the shock absorbing and compensating member.

Other features and advantages of the invention will become more readily apparent from the following description and the accompanying illustrative drawing.

In the drawing:—

Figure 1 is an elevational view of the complete assemblage or device as a unit showing the preferred embodiment of my idea and disclosing the general shape or configuration.

Figure 2 is a top plan view of Figure 1.

Figure 3 is a vertical sectional view, the view being taken at approximate right angles to Figure 1.

Referring now to the drawing by detailing reference numerals I call attention first to the major part 7. This is in the nature of a rubber block of rubber or equivalent composition, preferably cylindrical in cross-sectional configuration and of appropriate dimensions. This serves as a jointing member and is desirable because of its compensating and shock absorbing and insulating properties. Adjacent its upper and lower ends it is formed with horizontal passages lined with metal tubes or bushings 8. These serve as reinforcing holders for the attaching bolts 9, said bolts serving to fasten in place the complemental metal cups or caps 10 and 11, respectively. The lower cap 11 is formed on its disk side with outstanding studs or equivalent attaching means 12 whereby it may be appropriately secured or fastened to a supporting arm or other existing stock part of the farm machinery. Incidentally the means 12 will obviously have to be varied to become adaptable to different types of farm machinery to which the invention may be applied. The upper cup is provided with a central upstanding shank 13 terminating in a ball joint connector 14. To this is attached the adapter fixture or bracket 15. This part 15 is in effect the means which is designed for direct attachment to the conventional operator's seat (not shown). The fitting or fixture 15 comprises an apertured attaching plate made up of the companion flange section 16 of the duplicate counter-parts of the unitary fixture. The shank portions of the counter-parts are fastened together by bolts 17 and carry semi-spherical members 18 which cooperate in providing a socket for reception of the ball joint connector 14. This arrangement allows the adapter bracket 15 to be angled in proper relation to the shank 13, the ball and socket connection making the adjustment expeditious and easy to accomplish. When the proper position of parts is attained the bolts 17 are tightened to fasten the bracket 15 rigidly to the ball 14 so that it is then directly connected with the compressible resilient block 7 through the instrumentality of the adjoining cap 10.

It is submitted that a device of the type herein shown and described constitutes an ingenuous contrivance which should satisfactorily fulfil the special purposes for which it is intended. It is characterized by such indispensable features as practicability, durability, simplicity and efficiency, as well as economy in construction and use. It is sufficiently reliable to justify endorsement by the average user and the trade in general. Its adoption and use on farm machinery of the type specified tends to minimize vibrations otherwise transmitted directly through the usual metallic parts to the body of the occupant of the seat. In so doing shock is materially reduced, side swaying is virtually neutralized and the result is that the occupant is not so readily fatigued due to the fact that he may experience, through the use of this invention, comfort to a degree promoting correct sitting posture.

It is thought that persons skilled in the art to which the invention relates will be able to obtain a clear understanding of the invention after considering the description in connection with the drawing. Therefore, a more lengthy description is regarded as unnecessery.

Minor changes in shape, size, and rearrangement of details coming within the field of invention claimed may be resorted to in actual practice, if desired.

What is claimed is:—

1. A seat mounting and connecting device for use in association with agricultural machinery comprising a substantially solid body of compressible, yieldable and shock insulating properties having horizontal passages extending transversely therethrough adjacent its upper and lower ends, tubular metal bushings fitted in said passages to serve as reinforcing, connecting and wear members, substantially duplicate metal cups capped over the opposite ends of said body, attaching and assembling bolts passing through said bushing and separably connecting with the rim portions of said cups and detachably connecting the rim portions to the adjacent ends of said body, means on the lower cup for operative connection with the frame of the machinery, the upper cup being provided with an integral upstanding shank terminating in a ball joint connector, and an adapter bracket comprising an attaching plate and a sectional socket adjustably fastened to said ball joint connector.

2. As a component part of a seat connecting device of the class described, a substantially circular cup adapted to fit in a cap-like manner over one end of a complemental cylindrical block of rubber, said cup including a disk portion formed with a centrally located laterally projecting shank terminating in an integral ball connecting head, and a companion adapter and attaching bracket comprising a pair of identical complemental flat plate sections separably contacting each other and bolted together, said sections being formed at corresponding ends with portions defining a spherical socket adjustably and detachably clamped to said ball connecting head, and being formed at their opposite ends with right angularly disposed duplicate outstanding flanges disposed in a plane flush with each other and in parallelism above the disk portion of said cap and providing a unitary attaching member suitable for connection with a conventional operator's seat, the rim portion of said cup being provided with diametrically opposite bolt holes, and a bolt and nut cooperable with said rim and holes.

3. A seat mounting and connecting device for use in association with agricultural machinery comprising a vertically elongated solid rubber body cylindrical in cross-sectional form, said body having flat ends and being provided adjacent said ends with centrally arranged horizontally disposed metal lined passages, a circular metal cap fitting over the lower end of said body and provided with integral means for operatively connecting it to a conventional supporting arm or the like, a second substantially duplicate circular metal cap fitting telescopically over the upper end of said body and provided with means for attachment to a conventional operator's seat, and bolts passing through metal lined passages and connected with the rim portions of the respective caps to hold the caps removably and adjustably in place.

PAUL CAVITT.